United States Patent [19]

Schreck et al.

[11] Patent Number: 5,811,185
[45] Date of Patent: Sep. 22, 1998

[54] LOW TEMPERATURE HEAT SEALABLE BIAXIALLY ORIENTED POLYPROPYLENE FILMS COMPRISING PROPYLENE/BUTYLENE RESIN

[75] Inventors: Michael Schreck, Frankfurt; Gunter Schloegl, Kelkheim; Klaus Thoeren; Adolf Wilhelm, both of Wiesbaden, all of Germany

[73] Assignee: Hoechst Aktiengesellschaft, Germany

[21] Appl. No.: 510,820

[22] Filed: Aug. 3, 1995

[30] Foreign Application Priority Data

Aug. 5, 1994 [DE] Germany .......................... 44 27 862.4

[51] Int. Cl.$^6$ ...................................... B32B 27/32
[52] U.S. Cl. ...................... 428/349; 428/35.7; 428/461; 428/512; 428/516; 156/305; 156/334; 264/173.16; 264/173.19; 264/235.8; 427/536
[58] Field of Search ................... 428/34.2, 35.8, 428/35.9, 36.4, 213, 214, 323, 347, 349, 354, 515, 516, 512, 461, 35.7; 525/240, 243; 264/235.8, 173.15, 173.16, 173.19, 177.19; 156/305, 334; 427/536

[56] References Cited

U.S. PATENT DOCUMENTS

| | | | |
|---|---|---|---|
| 4,211,952 | 7/1980 | Matsuda et al. | 525/240 |
| 4,294,889 | 10/1981 | Hashimoto | 428/515 |
| 4,339,495 | 7/1982 | Weiner | 428/349 |
| 4,375,989 | 3/1983 | Mäkinen | 106/300 |
| 4,447,271 | 5/1984 | Howard et al. | 106/300 |
| 4,502,263 | 3/1985 | Crass et al. | 53/396 |
| 4,698,261 | 10/1987 | Both et al. | 428/204 |
| 5,302,427 | 4/1994 | Murschall et al. | 428/34.2 |
| 5,338,790 | 8/1994 | Chatterjee | 514/400 |
| 5,342,695 | 8/1994 | Tsuratani et al. | 428/516 |
| 5,372,882 | 12/1994 | Peiffer et al. | 428/34.9 |
| 5,436,041 | 7/1995 | Murschall et al. | 428/34.2 |
| 5,496,600 | 3/1996 | Peiffer et al. | 428/35.5 |

FOREIGN PATENT DOCUMENTS

| | | |
|---|---|---|
| 2101875 | 2/1994 | Canada . |
| 2114749 | 8/1994 | Canada . |
| 0 044 515 | 1/1982 | European Pat. Off. . |
| 0 078 633 | 5/1983 | European Pat. Off. . |
| 0 114 312 | 8/1984 | European Pat. Off. . |
| 0 180 087 | 5/1986 | European Pat. Off. . |
| 0 246 369 | 11/1987 | European Pat. Off. . |
| 0 480 282 | 4/1992 | European Pat. Off. . |
| 0 578 149 | 1/1994 | European Pat. Off. . |
| 0 582 953 | 2/1994 | European Pat. Off. . |
| 0 611 647 | 8/1994 | European Pat. Off. . |
| 43 04 377 A | 8/1994 | Germany . |
| 1 452 424 | 10/1976 | United Kingdom . |
| 1 582 186 | 12/1980 | United Kingdom . |

*Primary Examiner*—Paul J. Thibodeau
*Assistant Examiner*—D. Lawrence Tarazano
*Attorney, Agent, or Firm*—Connolly & Hutz

[57] ABSTRACT

This invention provides a polyolefinic multilayer film which has a base layer containing polypropylene and at least one outer layer. The outer layer contains at least 50% by weight of a propylene/butylene resin composition. The propylene/butylene resin composition has a low degree of crystallinity and is modified by a surface treatment, e.g. corona treatment. The surface treatment raises the minimum heat-sealing temperature to the range of 85° to 110° C. and unexpectedly reduces the film's tendency to block. The resulting multilayer film is useful in packaging.

18 Claims, No Drawings

LOW TEMPERATURE HEAT SEALABLE BIAXIALLY ORIENTED POLYPROPYLENE FILMS COMPRISING PROPYLENE/ BUTYLENE RESIN

BACKGROUND OF THE INVENTION

1. Field of the Invention

The invention relates to a polyolefinic multilayer film comprising a base layer containing polypropylene, and at least one outer layer. The invention also relates to the use of this film for wrapped packages having at their ends at least three film plies lying one on top of the other.

2. Description of the Related Art

Sensitive products (foodstuffs, chocolate and cookies) and the increasing speed of packaging machines require films having a low minimum heat-sealing temperature in combination with excellent passage through the packaging machine. The prior art discloses films which have minimum heat-sealing temperatures of around 100° C., in some cases even as low as 74° C. However, the production and use of these films present serious disadvantages.

EP-A-0 114 312 and EP-A-0 114 311 describe transparent or opaque polypropylene films having a minimum heat-sealing temperature of below 100° C. and good passage through the machine. These films have an outer layer comprising a mixture of $C_2/C_3/C_4$ terpolymer and $C_3/C_4$ copolymer and a low-molecular-weight resin, polypropylene homopolymer and poly-diorganosiloxane. According to this teaching, the wide heat-sealing range of the film and the low minimum heat-sealing temperature are achieved by the olefin resin composition of copolymer and terpolymer. The minimum heat-sealing temperature is 90° C. The incorporation of hydrocarbon resins into the outer layer causes resin deposits on the stretching rolls during production. These deposits cause streaking. The rolls must be cleaned frequently.

EP-A-0 480 282 describes a biaxially oriented multilayer polyolefin film which can be heat-sealed at low temperatures on both sides and whose base layer contains a peroxidically degraded propylene homopolymer and whose outer layers contain mixtures of $C_2/C_3/C_4$ terpolymer and $C_2/C_3$ copolymer and also a combination of $SiO_2$ and polydialkylsiloxane. The polydialkylsiloxane has high viscosity and is added in the form of a masterbatch. The minimum heat-sealing temperature is 88 ° C.

European Patent Application No. 94101786.5, which has not yet been published, describes multilayer films having at least one outer layer with a low sealing temperature. The outer layer comprises a $C_3/C_4$-olefin resin composition of low crystallinity and has a minimum heat-sealing temperature of less than 84° C. During production, films containing this outer layer have a high tendency to stick to themselves and to hot machine parts, such as, for example, stretching rolls. Furthermore, the packages produced therefrom have a high tendency to block, in particular during storage in the sun at summer temperatures, such as, for example, in a cigarette machine, and are therefore unsuitable for this use.

The prior art also discloses heat-sealable outer layers comprising $C_2/C_3$ copolymers and comprising $C_2/C_3/C_4$ terpolymers. All these films have minimum heat-sealing temperatures of above 100° C.

Also known are cigarette packs preferably comprising multilayer opaque films, such as described in EP-A-0 582 953. The outer layer materials described here are conventional propylene polymers and mixtures thereof. These outer layer raw materials employed in the prior art have the above-described disadvantages of a high minimum heat-sealing temperature, roll deposits or a tendency to stick and must be optimized. It is furthermore to be found that the seal seam of the film on the faces of the cigarette pack is poor. In particular, the points of the seal seam formed from more than three film layers lying one on top of the other are particularly critical, since the requisite heat does not pass through all these layers in the heat-sealing time available.

SUMMARY OF THE INVENTION

It is an object of the invention to provide a multilayer film which has good heat sealing properties. It is a particular object of the invention to provide a film which can easily be heat sealed at high cycle rates on high speed packaging machines.

It is a further object of the invention to provide a film that has no tendency to block under conventional storage conditions.

It is an additional object of the invention to provide a film that can be produced without depositions for example on stretching rolls during the production.

It is a further object of the invention to provide a film with low haze for transparent embodiments of the invention.

It is an additional particular object of the invention to provide a film which is printable on its low heat-sealable surface.

In achieving these other readily apparent objects of the invention there is provided a polyolefine multilayered film comprising a base layer comprising polypropylene and at least one outer layer, wherein the outer layer comprises at least about 50% by weight based on the weight of the outer layer of a $C_3/C_4$-olefin resin composition which has a low degree of crystallinity and wherein the outer layer has been modified by surface treatment and/or by the addition of a propylene polymer, and wherein the outer layer has a minimum heat-sealing temperature of from about 85° to about 110° C.

Other objects of the invention are achieved by providing a process for producing a film according to the invention.

Additional objects of the invention are achieved by a method of using the film according to the invention.

A further object of the invention is achieved by a packaging or laminates comprising a film according to the invention.

DESCRIPTION OF THE PREFERRED EMBODIMENT

Depending on the intended area of application, the respective embodiment of the film according to the invention can be transparent, matt, opaque, white or white/opaque.

The film according to the invention comprises at least one core layer and the outer layer essential to the invention, the core layer essentially comprising a propylene polymer or a polypropylene mixture.

The propylene polymer comprises predominantly (at least about 90%) propylene and has a melting point of about 140° C. or above, preferably from about 150° to about 170° C. Isotactic homopolypropylene having an n-heptane-soluble content of about 6% by weight or less, based on the isotactic homopoly-propylene, copolymers of ethylene and propylene having an ethylene content of about 10% by weight or less and copolymers of propylene with $C_4$-$C_8$-olefins having an α-olefin content of about 10% by weight or less are preferred propylene polymers for the core layer, isotactic homopolypropylene being particularly preferred. The percentages by weight given relate to the respective copolymer. The propylene polymer of the core layer generally has a melt flow index of from about 0.5 g/10 min to about 8 g/10 min, preferably from about 2 g/10 min to about 5 g/10 min, at 230° C. and a force of 21.6N (DIN 53 735). Furthermore, a mixture of said propylene homopolymers and/or copolymers and/or other polyolefins, in particular having 2 to 6 carbon atoms, containing at least about 50% by weight, in particular at least about 75% by weight, of propylene polymer is also suitable. Other polyolefins which are compatible in the polymer mixture are polyethylenes, in particular HDPE, LDPE and LLDPE, where the proportion of these polyolefins is in each case not more than about 15% by weight, based on the polymer mixture.

The polypropylene polymer employed in the core layer may be partially degraded by addition of organic peroxides. A measure of the degree of degradation of the polymer is the degradation factor A, which gives the relative change in melt flow index, measured in accordance with DIN 53 735, of the polypropylene, based on the starting polymer.

$$A = \frac{MFI_2}{MFI_1}$$

$MFI_1$ = melt flow index of the polypropylene polymer before addition of the organic peroxide
$MFI_2$ = melt flow index of the peroxidically degraded polypropylene polymer In general, the degradation factor A of the polypropylene polymer employed is in the range from about 3 to about 15, preferably from about 6 to about 10.

Particularly preferred organic peroxides are dialkyl peroxides, where the term alkyl radical is taken to mean a conventional saturated, straight-chain or branched lower alkyl radical having up to 6 carbon atoms. Particular preference is given to 2,5-dimethyl-2,5-di(t-butylperoxy)hexane and di-t-butyl peroxide.

Opaque, white or white/opaque embodiments of the films additionally contain fillers in the core layer and/or in further layers in an amount of from about 5 to about 20% by weight, based on the total weight of the film. In the context of the invention opaque films are defined to be films comprising at least one voided layer. Such voided layers comprise void-initiating particles as a filler, which are well known in the art.

The fillers in the base layer are conventional inorganic and/or organic, polypropylene-incompatible materials. The preferred inorganic fillers include aluminum oxide, aluminum sulfate, barium sulfate, calcium carbonate, magnesium carbonate, silicates, such as aluminum silicate, (kaolin) and magnesium silicate (talc), silicon dioxide and/or titanium dioxide, of which calcium carbonate, silicon dioxide, titanium dioxide or mixtures thereof. Calcium carbonate (chalk) is particularly preferred. Suitable organic fillers are conventional polymers which are incompatible with the polymer of the base layer, the preferred are such as but are not limited to, polyesters, polystyrenes, polyamides and halogenated organic polymers, preference being given to polyesters, such as, for example, polybutylene terephthalates. In addition, cycloolefin polymers are also particularly suitable fillers. The amount of filler in the base layer, in particular the amount of $CaCO_3$, is, according to the invention, from about 1 to about 20% by weight, preferably from about 3 to about 15% by weight, based on the total weight of the film. The mean particle size of the fillers, in particular of the $CaCO_3$, is in the range from about 1 to about 5 $\mu$m, preferably in the range from about 1.5 to about 4 $\mu$m.

Even with a relatively low filler content of from about 3 to about 13% by weight, a density of the opaque embodiments of less than about 0.8 g/cm$^3$ is achieved. In general, the density of the opaque film according to the invention is in the desirable range of from about 0.4 to about 0.75 g/cm$^3$. The density is reduced due to the voids of the opaque layer.

In addition to the preferred calcium carbonate, a suitable further core layer additive, if present, is titanium dioxide, which may be employed in the base layer in combination with $CaCO_3$. In a preferred embodiment, the titanium dioxide particles comprise at least 95% by weight of rutile. The titanium dioxide particles are preferably employed with a coating of inorganic oxides, as usually used as a coating for $TiO_2$ white pigment in papers or paints for improving the lightfastness. Inorganic oxides which are particularly suitable include the oxides of aluminum, silicon, zinc and magnesium or mixtures of two or more of these compounds. They are precipitated from water-soluble compounds, for example alkali metal aluminates, in particular sodium aluminate, aluminum hydroxide, aluminum sulfate, aluminum nitrate, sodium silicate or silicic acid, in the aqueous-suspension. Coated $TiO_2$ particles are described, for example, in EP-A-0 078 633 and EP-A-0 044 515.

The coating may also contain inorganic compounds containing polar and non-polar groups. Preferred organic compounds are alkanols and fatty acids having from about 8 to about 30 carbon atoms in the alkyl group, in particular fatty acids and primary n-alkanols having about 12 to about 24 carbon atoms, and polydiorganosiloxanes and/or polyorganohydrogen siloxanes, such as polydimethylsiloxane and polymethylhydrogensiloxane.

The coating on the $TiO_2$ particles usually comprises from about 1 to about 12 g, in particular from about 2 to about 6 g, of inorganic oxides, and optionally additionally from about 0.5 to about 3 g, in particular from about 0.7 to about 1.5 g, of organic compounds, based on 100 g of $TiO_2$ particles. The coating is applied to the particles in aqueous suspension. It has proven particularly advantageous for the $TiO_2$ particles to be coated with $Al_2O_3$ or with $Al_2O_3$ and polydimethylsiloxane.

The proportion of titanium dioxide in the core layer—if present—is from about 1 to about 9% by weight, preferably from about 3 to about 5% by weight, based on the total weight of the film. The mean particle size is very small and is preferably from about 0.15 to about 0.40 $\mu$m, where the particle size stated relates to the coated particles.

$TiO_2$ is preferably used in the base layer in addition to $CaCO_3$ if a white/opaque appearance of the film is desired. Films having a base layer containing only filler usually have a hazy, opaque appearance caused by scattering processes at the vacuoles of the base layer. This should be distinguished from a white appearance, which is caused by coloring by pigments, preferably $TiO_2$.

The core layer may furthermore contain a low-molecular-weight resin whose proportion is from about 1 to about 30% by weight, preferably from about 2 to about 10% by weight. Low molecular weight resins are defined to have a molecular weight Mw of about 400 to about 5000, preferably about 500 to about 2000. The softening point of the resin is from about 130° to about 180° C. (measured in accordance with DIN 1995-U4, corresponding to ASTM E-28), preferably from about 140° to about 160° C. Of the numerous low-molecular-weight resins, preference is given to hydrocarbon resins in the form of petroleum resins, styrene resins, cyclopentadiene resins and terpene resins (these resins are described in Ullmanns Encyklopadie der techn. Chemie, 4th Edition, Volume 12, pages 525 to 555). Suitable petroleum resins are described in numerous publications, such as, for example, EP-A-0 180 087, which is incorporated by reference herein.

It is furthermore preferred to add antistatics, such as, for example, tertiary aliphatic amines or glycerol monostearates, to the base layer. The type and amount of the antistatics are described in detail below.

In addition to the core layer, the multilayer film according to the invention comprises at least one outer layer which can be heat-sealed at low temperatures and which comprises a $C_3/C_4$-olefin resin composition with a low degree of crystallinity. In general, the outer layer comprises at least about 50% by weight, preferably from about 60 to 100% by weight, in particular from about 70 to about 95% by weight, in each case based on the weight of the outer layer, of the olefin resin composition. It is essential to the invention that this outer layer is modified by suitable measures so that the minimum heat-sealing temperature is in the range from about 85° to about 110° C. Without these measures, i.e. in pure form, the $C_3/C_4$-olefin resin composition has a minimum heat-sealing temperature of below 84° C. It has been found that surface treatment like corona or flame treatment of the $C_3/C_4$-olefin resin-containing outer layer increases the minimum heat-sealing temperature to a range of from about 85° to about 110° C. and at the same time other properties of the film are, surprisingly, improved. As an alternative to corona or flame treatment, the $C_3/C_4$-olefin resin composition can also be modified by blending with other propylene polymers, where this blending must likewise increase the minimum heat-sealing temperature to from about 85° to about 110° C. The $C_3/C_4$-olefin resin composition of low crystallinity can be characterized by the following data:

Melting point: <about 130° C., preferably from about 105 to about 120° C.

Recrystallization temperature: <about 80° C., preferably from about 55° to about 80° C.

Enthalpy of melting: <about 67 J/g, preferably from about 50 to about 60 J/g $C_3$ content: from about 60 to about 85% by weight, preferably from about 70 to about 80% by weight, in each case based on the weight of the copolymer, or from about 60 to about 85 mol %, preferably from about 70 to about 80 mol %, in each case based on the copolymer $C_4$ content: from 15 to 40% by weight, preferably from about 20 to about 30% by weight, in each case based on the weight of the copolymer, or from about 15 to about 40 mol %, preferably from about 20 to about 30 mol %, in each case based on the copolymer Particular preference is given to a $C_3/C_4$ olefin resin composition whose melting point is about 110.6° C., whose recrystallization temperature is about 60° C. and whose enthalpy of melting is about 56.7 J/g. The minimum heat-sealing temperature of an outer layer comprising this pure component is in the range from about 65° to about 80° C.

In the context of the invention "low crystallinity polymers" is defined to be a polymer with a recrystallization temperature of less than about 80°0C., preferably from about 55° to about 80° C.

The outer layer comprises the propylene polymers suitable for the modification in a maximum amount of about 50% by weight, preferably from more than 0 to about 40% by weight, in particular from about 5 to about 30% by weight, in each case based on the weight of the outer layer. Particularly suitable propylene polymers for the modification are the following polymers:

Propylene homopolymer or copolymer of
  ethylene and propylene or
  ethylene and 1-butylene or
  propylene and 1-butylene or
terpolymer of
  ethylene and propylene and 1-butylene or
a mixture of two or more of said homopolymers, copolymers and terpolymers or
a blend of two or more of said homopolymers, copolymers and terpolymers, optionally mixed with one or more of said homopolymers, copolymers and terpolymers,
particular preference being given to propylene homopolymer or
  random ethylene-propylene copolymers having
    an ethylene content of from about 1 to about 10% by weight,
    preferably from about 2.5 to about 8% by weight, or
random propylene-1-butylene copolymers having a butylene content of from about 2 to about 25% by weight, preferably from about 4 to about 20% by weight, in each case based on the total weight of the copolymer,
or random ethylene-propylene-1-butylene terpolymers having
an ethylene content of from about 1 to about 10% by weight, preferably from about 2 to about 6% by weight, and a 1-butylene content of from about 2 to about 20% by weight, preferably from about 4 to about 20% by weight, in each case based on the total weight of the terpolymer, or
a blend of an ethylene-propylene-1-butylene terpolymer and a propylene-1-butylene copolymer
having an ethylene content of from about 0.1 to about 7% by weight
and a propylene content of from about 50 to about 90% by weight
and a 1-butylene content of from about 10 to about 40% by weight,
in each case based on the total weight of the polymer blend.

Particularly preferred for the modification are polymers such as ®TAFMER XR 107L from Mitsui and ®PKS 309 from Solvay.

Optionally, the outer layer modified by blending can also additionally be corona- or flame-treated.

In a preferred embodiment, the outer layer according to the invention contains an antiblocking agent. The type and amount of antiblocking agents are described below.

The multilayer film has at least two layers and always comprises, as essential layers, the core layer and at least one outer layer according to the invention. Depending on the proposed application, the film may contain a further outer layer and/or further interlayers. Outer layers on both sides can in principle be identical or different in structure, composition and thickness, i.e. the second outer layer can contain either the same modified olefin resin composition with a low degree of crystallinity as described above or other known heat-seatable propylene polymers, such as, for example, $C_2/C_3$ copolymers, $C_2/C_3/C_4$ terpolymers or mixtures thereof, or non-heat-sealable homopolymers. In a preferred embodiment, the second outer layer cannot be printed and has a minimum heat-sealing temperature which is above that of the outer layer according to the invention.

In addition, the multilayer film according to the invention may contain interlayers on one or both sides. Interlayers are particularly preferred for opaque embodiments and in this case preferably contain $TiO_2$ as described above as an additive.

The thickness of the modified outer layer according to the invention which can be heat-sealed at low temperature is greater than about 0.3 μm and is generally from about 0.4 to about 5 μm. The outer layer thickness is preferably in the range from about 0.6 to about 3 μm, in particular in the range from about 0.8 to about 1.5 μm. The overall thickness of the film depends on the intended application and can vary within broad limits. In general, the overall thickness is in the range from about 5 to about 150 μm, preferably in the range from about 10 to about 100 μm, in particular in the range from about 15 to about 70 μm. Opaque embodiments are in the range from 5 to about 150 μm, preferably in the range from about 40 to about 100 μm, in particular in the range from about 60 to about 90 μm.

In order to further improve certain properties of the polypropylene film according to the invention, the core layer and the outer layer(s) can contain further additaments which do not impair the essential film properties, in an effective amount in each case, preferably lubricants and/or stabilizers and/or neutralizers which are compatible with the polymers of the core layer and the outer layer(s). All amount data below in percent by weight (% by weight) relate to the layer or layers to which the additive has been added.

Lubricants are higher aliphatic acid amides, higher aliphatic esters, waxes and metal soaps and polydimethylsiloxanes. The effective amount of lubricant is in the range from about 0.1 to about 3% by weight. The addition of higher aliphatic acid amides in the range from about 0.15 to about 0.25% by weight in the base layer and/or outer layers is particularly suitable. A particularly suitable aliphatic acid amide is erucamide.

The addition of polydimethylsiloxanes is preferred in the range from about 0.05 to about 2.0% by weight, in particular in the range from about 0.07 to about 0.2% by weight, in particular polydimethylsiloxanes having a viscosity of from about 10,000 to about 1,000,000 $mm^2/s$.

The stabilizers employed can be the conventional stabilizing compounds for ethylene, propylene and other -olefin polymers. The amount thereof added is from about 0.05 to about 2% by weight. Phenolic stabilizers, alkali/alkaline earth metal stearates and/or alkali/alkaline earth metal carbonates are particularly suitable. Phenolic stabilizers are preferred in an amount of from about 0.1 to about 0.6% by weight, in particular from about 0.15 to about 0.3% by weight, and with a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3, 5-di-tert-butyl-4-hydroxybenzyl)benzene are particularly advantageous.

Neutralizers are preferably calcium stearate and/or calcium carbonate having a mean particle size of at most about 0.7 μm, an absolute particle size of less than about 10 μm and a specific surface area of at least about 40 $m^2/g$.

The invention furthermore relates to a process for the production of the multilayer film according to the invention by the coextrusion process known per se. This process involves coextruding the melts corresponding to the individual layers of the film through a flat-film die, taking off the resultant film on one or more rolls for solidification, subsequently biaxially stretching (orienting) the film, heat-setting the biaxially stretched film and, if desired, corona-treating the film on the surface layer intended for corona treatment.

The biaxial stretching (orientation) is generally carried out consecutively, preference being given to consecutive biaxial stretching in which stretching is carried out first longitudinally (in the machine direction) and then transversely (perpendicular to the machine direction).

As usual in the coextrusion process, the polymer or polymer mixture of the individual layers is first compressed and liquefied in an extruder, it being possible for any additives added to be already present in the polymer. The melts are then simultaneously forced through a flat-film die, and the extruded multilayer film is taken off on one or more take-off rolls, during which it cools and solidifies.

The resultant film is then stretched longitudinally and transversely to the extrusion direction, which results in an orientation of the molecule chains. The stretching in the longitudinal direction is preferably from about 4:1 to about 7:1 and in the transverse direction is preferably from about 6:1 to about 11:1. The longitudinal stretching is expediently carried out with the aid of two rolls running at different speeds corresponding to the desired stretching ratio, and the transverse stretching is carried out with the aid of an appropriate tenter frame.

The biaxial stretching of the film is followed by heat-setting (heat treatment) thereof, during which the film is kept at a temperature of from about 120° to about 170° C., preferably from about 140° to about 160° C., for from 0.5 to about 10 s. The film is subsequently wound up in a conventional manner using a wind-up unit.

It has proven particularly favorable to keep the take-off roll or rolls, which also cool and solidify the extruded film, at a temperature from about 10° to about 90° C., preferably from about 20 to about 60° C.

In addition, the longitudinal stretching is advantageously carried out at a temperature of less than about 150° C., preferably in the range from about 110° to about 140° C., and the transverse stretching is advantageously carried out at a temperature above about 140° C., preferably at from about 145° to about 180° C. The film is heated to the requisite stretching temperature by means of an air heating box.

After the biaxial stretching, the film is, in order to modify the $C_3/C_4$-resin-containing outer layer, corona- or flame-treated on this surface. If the outer layer is modified by blending with other propylene polymers, the corresponding treatment can, optionally be omitted.

Corona treatment involves passing the film between two conductor elements serving as electrodes, with such a high voltage, usually an alternating voltage (about 10,000 V and 10,000 Hz) being applied between the electrodes that spray or corona discharges can occur. The spray or corona discharge causes the air above the film surface to ionize and react with the molecules of the film surface, forming polar intrusions in the essentially nonpolar polymer matrix. The treatment intensities are within usual limits, preferably from about 38 to about 45 mN/m.

In a preferred flame treatment, the film is passed over a chill roll above which a gas burner is arranged. The film is pressed hard against the chill roll by a nip roll. The gas flowing out of the burner is ignited and forms flames with a length of from about 5 to 10 mm. The oxidizing part of the flame hits the film surface and causes an increase in the surface energy of the film. This too is within conventional limits.

The film according to the invention is distinguished by a low minimum heat-sealing temperature, in the range from about 85° to about 110° C., preferably from about 85° to about 95° C., a good seal seam strength surprisingly also being achieved during heat-sealing of or through a plurality of layers of the film. The novel film is therefore particularly suitable for cigarette wrapping on high-speed packaging machines.

The characteristic feature of this type of packaging is the wrapping on the faces of the pack. In these areas, owing to the multiple folding, at least three or even five layers of the film come to lie one on top of the other. During heat-sealing on these faces, the heat necessary for heat-sealing must pass through these film layers in a sufficiently short time. Surprisingly, the riovel film containing the modified outer layer can be used extremely well for this application. This is particularly surprising in the case of the opaque embodiments of the film, which, owing to their high thickness and their vacuole-containing structure, has particularly good heat-insulation properties.

In addition, the modified outer layer is distinguished by good blocking values at elevated temperature. The film can be produced and processed without problems. It does not tend to stick to the rolls, and does not stick to itself even at high temperatures.

However, the low minimum heat-sealing temperature also opens up new areas of application, for example as a label film without additional adhesion promoters.

The invention is described in greater detail by the examples below:

EXAMPLE 1

A three-layer opaque film having an overall thickness of 60 µm, a density of 0.75 g/cm³ and an ABC layer structure, i.e. the base layer B is surrounded by an outer layer A and an outer layer C, was produced by coextrusion and subsequent stepwise orientation in the longitudinal and transverse directions. Before rolling up, the film was corona-treated on side A. The surface tension on this side as a consequence of the corona treatment was from 39 to 40 nM/m.

All layers contained 0.12% by weight of pentaerythrityl tetrakis[4-(3,5-di-tert-butyl-4-hydroxyphenyl) propionate] (IRGANOX® 1010) for stabilization and 0.06% by weight of calcium stearate as neutralizer.

The base layer B essentially comprised a polypropylene homopolymer having an n-heptane-soluble content of 3.5% by weight and a melting point of 162° C. The melt flow index of the polypropylene homopolymer was 3.4 g/10 min at 230° C. and a load of 21.6N (DIN 53 735). The base layer also contained 4.3% by weight of the chalk masterbatch ®MP 52355 from Multibase and 4% by weight of the TiO$_2$ batch ®P8555 from Schulman.

The polyolefinic outer layer A essentially comprised a mixture of 90% by weight of a random propylene-1-butene copolymer (TAFMER® XR 110 T) having a propylene content of 74.3 mol %, a 1-butene content of 25.7 mol %, based on the copolymer, a melting point of 110.6° C. and a recrystallization temperature of 60° C., and 10% by weight of ethylene-propylene-butene terpolymer TAFMER® XR 107. The outer layer A contained 0.35 % by weight of the antiblocking agent silicon dioxide having a mean particle diameter of 4 µm. The thickness of the outer layer was 0.8 µm.

The polyolefinic outer layer C essentially comprised ethylene-propylene-1-butene tertpolymers having a content of 3.5% by weight of ethylene, 88.5% by weight of propylene and 8% by weight of 1-butene. The terpolymer contained 0.30% by weight of silicon dioxide having a mean particle diameter of 4 µm. The thickness of the outer layer was 0.8 µm.

EXAMPLE 2

Example 1 was repeated. The polyolefinic outer layer A, which had been corona-treated, comprised 60% by weight of a random propylene-1-butene copolymer having a content of 74.3 mol % of propylene and 25.7 mol % of 1-butene, and 40% by weight of TAFMER® XR 107. The copolymer contained 0.35% by weight of a silicon dioxide having a mean particle diameter of 4 µm. The thickness of the outer layer was 0.9 µm.

Comparative Example 1

Example 1 was repeated. The polyolefinic outer layer A essentially comprised a propylene-1-butene copolymer having a content of 74.3 mol % of propylene and 25.7 mol % of 1-butene. The outer layer contained 0.35% by weight of the antiblocking agent silicon dioxide having a mean particle diameter of 4 µm. The thickness of the outer layer was 0.8 µm.

The properties of the films of the examples and comparative example are shown in the table below.

In order to characterize the raw materials and the films, the following measurement methods were used:

Melt flow index (MFI)

DIN 53 735 at a load of 21.6N and at 230° C.

Melting point

DSC measurement, maximum of the melting curve, heating rate 20° C./min.

Gloss

The gloss was determined in accordance with DIN 67 530. The reflector value was measured as an optical characteristic of the surface of a film. In accordance with the standards ASTM-D 523-78 and ISO 2813, the angle of incidence was set at 60° or 20° A light beam hits the planar test surface at the set angle of incidence and is reflected or scattered thereby. The light beams incident on the photoelectronic receiver are indicated as a proportional electrical quantity. The measurement value is dimensionless and must be given together with the angle of incidence.

Seal seam strength at 100°C.

For the determination, two film strips 15 mm in width were laid one on top of the other and sealed at 100° C. for 0.5 sec at a pressure of 10 mm² (instrument: Brugger type NDS, sealing jaws heated on one side). The seal seam strength was determined by the T-peel method.

Determination of the minimum heat-sealing temperature

Heat-sealed samples (seal seam 20 mm×100 mm) are produced using the Brugger HSG/ET sealing unit by sealing a film at different temperatures with the aid of two heated sealing jaws at a pressure of 10 N/cm² for 0.5 sec. Test strips with a width of 15 mm are cut out of the sealed samples. T seal seam strength, i.e. the force necessary to separate the test strips, is determined using a tensile testing machine at a peel rate of 200 mm/min, during which the seal seam plane forms a right angle with the direction of tension. The minimum heat-sealing temperature is the temperature at which a seal seam strength of at least 0.5 N/15 mm is achieved.

Determination of the blocking behavior at elevated temperature

In order to measure the blocking behavior at elevated temperature, two wooden blocks measuring 72 mm×41 mm×13 mm with felt stuck to one side are wrapped in the film to be measured and heat-sealed. A weight of 200 g is placed on the wooden blocks with the felt layers facing one another, and this set-up is introduced into an oven pre-heated to 70° C., where it is left for 2 hours. It is then cooled to room temperature (21° C.) for 30 minutes, the weight is removed from the wooden blocks and the upper block is removed from the lower block by means of a mechanical apparatus. The evaluation is carried out via 4 individual measurements, by means of which a maximum push-off force (measured in N) is determined. The specification is satisfied if none of the individual measurements is above 5N.

While there is shown and described herein certain specific structure embodying the invention, it will be manifest to those skilled in the art that various modifications and rearrangements of the parts maybe made without departing from the spirit and scope of the underlying inventive concept and that the same is not limited to the particular forms herein shown and described.

TABLE

|  | Minimum heat-sealing temperature (15 N/cm²; 0.5 s) [°C.] | | Seal seam strength (105° C.; 1.5 N/cm²; 0.5 s) [N/15 mm] | | Blocking | Surface tension [mN/m] |
|---|---|---|---|---|---|---|
|  | Side A/A | Side C/C | Side A/A | Side A/C | Side D/D |  |
| Example 1 | 89 | 114 | 2.2 | 1.3 | none | 39–40 |
| Example 2 | 94 | 114 | 2.0 | 1.1 | none | 39–40 |
| Comparative Example 1 | 77 | 114 | 2.3 | 1.5 | blocked | <32 |

We claim:

1. A polyolefinic multilayer film comprising an extruded base layer comprising polypropylene, and at least one coextruded additional layer, wherein the coextruded additional layer consists essentially of a copolymer of $C_3/C_4$-olefin resin containing about 60 to 85% by weight $C_3$ and about 15 to 40% by weight $C_4$, in each case based on the weight of the copolymer, the $C_3/C_4$ copolymer having a melting point of less than about 130° C. and a low degree of crystallinity with a recrystallization temperature of less than about 80° C., and wherein the additional layer has been modified by surface treatment such that said additional layer has a minimum heat-sealing temperature of from about 85° to about 110° C.

2. The multilayer film as claimed in claim 1, wherein the minimum heat-sealing temperature of the additional layer is in the range from about 85° to about 950° C.

3. The multilayer film as claimed in claim 2, wherein said melting point is from about 105° to about 120° C.

4. The multilayer film as claimed in claim 1, wherein the olefin resin has an enthalpy of melting of <about 67 J/g.

5. The multilayer film as claimed in claim 4 wherein said recrystallization temperature is from about 55° to about 70° C. and said enthalpy of melting is from about 50 to about 60 J/g.

6. The multilayer film as claimed in claim 1, wherein the olefin resin has a propylene content of from about 70 to about 80 mol %, and a butene content of from about 20 to about 30 mol %.

7. The multilayer film as claimed in claim 6, wherein the olefin resin has a propylene content of about 75 mol % and said butene content is about 25 mol %.

8. The multilayer film as claimed in claim 1, wherein said film comprises three, four or five layers.

9. The multilayer film as claimed in claim 1, wherein said film is transparent.

10. The multilayer film as claimed in claim 1, wherein said film is opaque.

11. The multilayer film as claimed in claim 1, wherein the base layer comprises an antistatic, and the additional layer comprises an antiblocking agent.

12. The multilayer film as claimed in claim 11, wherein said antistatic is a tertiary aliphatic amine and said antiblocking agent is $SiO_2$ having a particle size of from about 4 to about 6 μm.

13. A packaging film comprising the multilayer film as claimed in claim 1.

14. A laminate containing a multilayer film as claimed in claim 1.

15. The laminate as claimed in claim 14 wherein said laminate is paper, cardboard, metal, metallized plastic film or plastic film.

16. A method of using the multilayer film as claimed in claim 1, as a packaging film for wrapped packages comprising lying at least three multilayer film layers one on top of the other and heat sealing to form a package film for wrapped packages.

17. A process for the production of the multilayer film as claimed in claim 1, comprising coextruding melts corresponding to the individual layers of the film through a flat-film die, taking off the coextruded film via a take-off roll whose temperature is between about 10° and about 90° C., biaxially stretching the film at a longitudinal stretching ratio of from about 4:1 to about 7:1 and a transverse stretching ratio of from about 6:1 to about 11:1, and heat-setting the biaxially stretched film, corona-treating and subsequently winding up said film.

18. Packaging containing a multilayer film as claimed in claim 17.

* * * * *

UNITED STATES PATENT AND TRADEMARK OFFICE
CERTIFICATE OF CORRECTION

PATENT NO. : 5,811,185
DATED : September 22, 1998
INVENTOR(S) : Michael Schreck et al It is certified that error appears in the above-identified patent and that said Letters Patent is hereby corrected as shown below:

Column 5, line 59, "80°0C.," should read -- 80 ° C, --.

Column 9, line 12, "riovel" should read -- novel --.

Column 11, last line (claim 2, line 3), "950°C" should read -- 95°C --.

Signed and Sealed this

Sixteenth Day of February, 1999

Attest:

Attesting Officer

Acting Commissioner of Patents and Trademarks